Jan. 17, 1928.

E. J. DESROZIERS 1,656,779

FRICTION MEMBER FOR BRAKES, CLUTCHES, AND THE LIKE

Original Filed Jan. 29, 1926

Inventor
Edouard J. Desroziers
By
Attorney

Patented Jan. 17, 1928.

1,656,779

UNITED STATES PATENT OFFICE.

EDOUARD JEAN DESROZIERS, OF PARIS, FRANCE.

FRICTION MEMBER FOR BRAKES, CLUTCHES, AND THE LIKE.

Original application filed January 29, 1926, Serial No. 84,628, and in France December 31, 1925. Divided and this application filed July 12, 1926. Serial No. 121,957.

The present application is a division from my application Serial No. 84,628, filed January 29, 1926.

The present invention relates to improvements in the lining of all metallic friction members, brakes, clutches and all similar apparatus; it consists in effecting the casting in situ under pressure and the baking in these metallic members, specially prepared, of all materials which are bad heat conductors and having a high coefficient of friction such as asbestos, wood, or any other product and chemically treated for this particular use.

These metallic members are specially prepared, so that the friction material, under the action of the pressure to which it is subjected, thoroughly permeates all openings made in the metal, unites completely with it and thus affords a sufficient resistance to the action of wrenching away to which these friction linings will be subjected.

The preparations of the metallic members by drilling, stamping, and the like, have been fully structurally considered from a standpoint of advantage so that the rises in temperature produced:

1, by the baking at the time of manufacture, and, 2, by friction, at the time of operation of the apparatus on which they are to be installed, will not interfere with the practical adhesion of the said linings.

For the same reason, the dimensions of the cast lining will be particularly determined so that the differences of expansion will have no disadvantageous effect.

The present invention embodies the following additional advantages:

1. Elimination of rivets for fixing the friction material on the friction members.

2. Decrease in the amount of friction lining used, since:

(1) No need for the considerable thickness indispensable for carrying out good riveting.

(2) Reduction in general dimensions, since the whole surface enters into friction (it being unnecessary to deduct the area of the rivet holes).

3. Utilization of the material of only one disc of friction lining (instead of two) for the clutch discs, since the two faces take the friction.

4. Decrease in the weight and overall dimensions (principally in the case of multiple disc clutches).

5. Decrease in the inertia on declutching the driven lined discs.

6. Elimination of the friction of the securing rivets when wear in the linings occurs, thus avoiding, metal on metal rubbing, and hence rise in temperature and possibilities of seizure.

7. Above all, saving in the weight of metal used in the manufacture of the metallic members and also decrease in the waste of metal when cutting out the metallic members from the stock.

The present invention also comprises improvements in the friction members themselves, with the object of so producing them that they will more readily receive the lining cast thereon under pressure, and also to provide a friction member structure of easier and more economical manufacture and use. These friction members all have a metallic core and applied lining, and their particular advantage lies in the nature and form of the cores, according to the uses to which they are applied.

The invention is represented diagrammatically and by way of example in the annexed drawings, in which.

Figure 1:
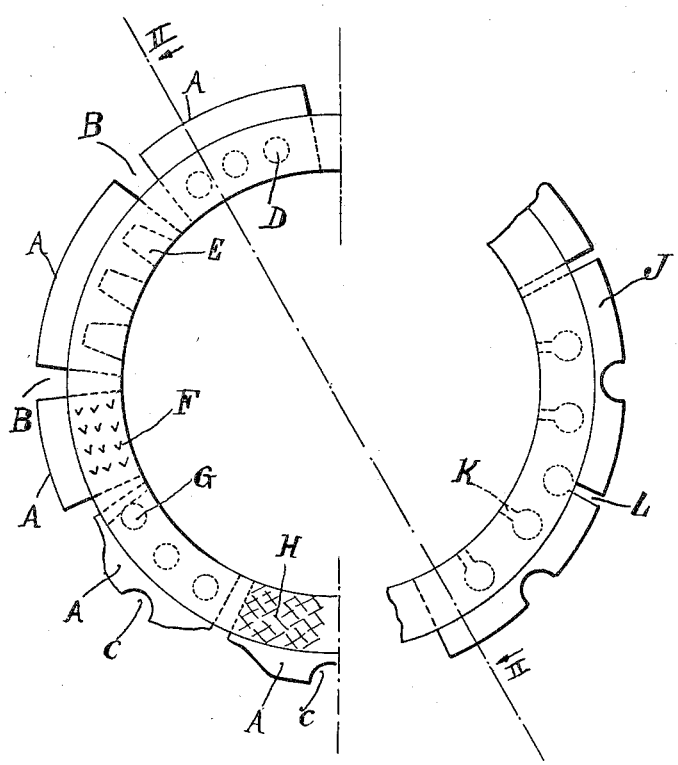
Fig. 1 shows a driving clutch disc according to the present invention, the right hand side part of Fig. 1 showing a slightly modified construction as compared with the left hand side.
Figure 2:
Fig. 2 is a section along the line II—II of Fig. 1.

Referring to the drawing, a driving friction disc is shown therein which can be manufactured very economically.

Until now, these discs were made by utilizing a steel perforated washer, grooved, or cut out in its exterior part to engage in the driving part of the motor fly-wheel; each of its faces was lined with a washer of insulating material, fixed by riveting.

By using moulds of suitable shape, these discs can be manufactured direct by arranging metallic plates A in these moulds separated by a sufficient distance to correspond with the driving ribs which are located at B between the plates A, or stamped to the shape of these notches as in C, on which will be placed on each face, the moulded material which will be very strongly compressed on it and then baked.

These plates A are perforated with holes cut out or notched, as shown at D, E, F, G and H to allow the material to penetrate therein.

Each of the plates A is independent so that deformation will be prevented during the baking operation.

Should it be desired to utilize metallic plates of larger dimension, as shown at J, they will be treated by the usual stamping processes further adding cuts K and L towards the interior and exterior of the disc, so that the action of the heat on the metallic plate, at the time of baking, or of the friction heat produced during operation, shall have no effect.

I claim:

1. A friction member comprising a plurality of plates in spaced relation to each other, a friction lining constituting the sole connection between said plates and notches in said plates for driving said friction member.

2. A friction member comprising a plurality of plates in spaced relation to each other, a friction lining constituting the sole connection between said plates, notches in said plates for driving said friction member and means on said plates for causing the friction lining to adhere thereto.

3. A friction member comprising a plurality of plates, a friction lining constituting the sole connection between said plates, means on said plates for causing the friction lining to adhere thereto, means in said plates for driving said friction member and notches in said plates to counteract their deformation due to heat.

4. A friction member comprising a plurality of segmental elements arranged along a circle and a friction lining constituting the sole connection between said elements.

5. A friction member comprising a plurality of circularly arranged separate and independent plates, and a friction lining constituting the sole connection between the said plates.

6. A friction member comprising a plurality of circularly arranged plates, and a ring of friction material in which portions of said plates are embedded, the outer portions of the plates projecting outwardly from the periphery of said ring.

7. A friction member comprising a plurality of circularly arranged spaced plates, and a ring of friction material in which the inner portions of said plates are embedded, the outer portions of the plates projecting outwardly from the periphery of said ring.

8. A friction member comprising a plurality of separate and independent plates each having notches to counteract their deformation due to heat, and a friction lining applied to said plates and constituting the sole connection therebetween.

EDOUARD JEAN DESROZIERS.